(12) United States Patent
Aftab

(10) Patent No.: US 10,430,764 B2
(45) Date of Patent: Oct. 1, 2019

(54) SYSTEM AND METHOD FOR GENERATING A THREE-DIMENSIONAL RESUME

(71) Applicant: SkillGigs, Inc., Houston, TX (US)

(72) Inventor: Kashif Aftab, Houston, TX (US)

(73) Assignee: SkillGigs, Inc., Houston, TX (US)

( * ) Notice: Subject to any disclaimer, the term of this patent is extended or adjusted under 35 U.S.C. 154(b) by 741 days.

(21) Appl. No.: 14/918,157

(22) Filed: Oct. 20, 2015

(65) Prior Publication Data
US 2016/0110689 A1    Apr. 21, 2016

Related U.S. Application Data

(60) Provisional application No. 62/065,979, filed on Oct. 20, 2014.

(51) Int. Cl.
*G06Q 10/00* (2012.01)
*G06Q 10/10* (2012.01)

(52) U.S. Cl.
CPC .............. *G06Q 10/1053* (2013.01)

(58) Field of Classification Search
CPC . G06T 3/40; G06T 17/05; G06T 11/40; G06T 17/20; G06T 2200/24; G06T 2207/30204; G06T 7/73; G06T 11/001; G06T 11/206; G06T 19/20; G06T 15/00; G06T 15/503; G06T 2207/10061; G06T 2207/30148; G06T 2210/62; G06T 2219/2012; G06T 7/0004; G06T 7/001; G06T 11/00; G06T 15/06; G06T 19/00; G06T 19/006; G06F 16/9537; G06F 3/01; G06F 16/29; G06F 3/04847; G06F 11/00; G06F 16/2477; G06F 3/017; G06F 3/0481; G06F 3/04812; G06F 3/0482; G06F 3/04845; G06F 3/0486; G06F 16/444; G06F 17/50; G06F 2203/04105;
(Continued)

(56) References Cited

U.S. PATENT DOCUMENTS

2008/0222133 A1    9/2008  Au et al.
2009/0287694 A1   11/2009  Mcgowan et al.
(Continued)

OTHER PUBLICATIONS

Greedy Algorithms for Packing Unequal Circles into a Rectangular Container. WenQi Huang, Yu Li, Hakim Akeb, ChuMin Li. May 15, 2003 https://pdfs.semanticscholar.org/9f04/17dbb3379c043da6af2525db3f3f4149c9f6.pdf.*
(Continued)

*Primary Examiner* — Gabrielle A McCormick
(74) *Attorney, Agent, or Firm* — Pillsbury Winthrop Shaw Pittman LLP

(57) ABSTRACT

Provided is a process, including: receiving resume data from a computing device of a job candidate, the resume data including: a plurality of roles the job candidate has occupied, for each of the roles, a plurality of skills used by the job candidate in the respective roles, for each of the skills, a measure of usage of the respective skill in the respective role; combining the measures of usage of the each skill across the plurality of roles to form a skill density score for each of the skills; receiving a request for information about job candidates from a computing device of a recruiter; and sending data indicative of the skill density scores for at least some of the skills to the computing device of the recruiter.

19 Claims, 14 Drawing Sheets

(58) Field of Classification Search
CPC .. G06F 2203/04806; G06F 3/03; G06F 3/033; G06F 3/0346; G06F 3/048; G06F 3/0485; G06F 3/0487; G06F 3/14; G06F 16/951; G06F 17/211; G06F 19/00; G06F 2203/04808; G06F 3/011; G06F 3/012; G06F 3/013; G06F 3/02; G06F 3/023; G06F 3/0304; G06F 3/03547; G06F 3/0416; G06F 3/04815; G06F 3/04842; G06F 3/04883; G06F 9/451; G06Q 40/12; G06Q 10/06; G06Q 30/0265; G06Q 50/06; G06Q 30/02; G06Q 30/0201; G06Q 30/0603; G06Q 30/0623; G06Q 30/0641; G06Q 40/06; G06Q 50/18; G06Q 50/26; G06Q 10/00; G06Q 10/1095; G06Q 40/00; G06Q 40/04; G06Q 50/265; G09B 29/003; G09B 29/004; G09B 29/10; G09B 29/02

See application file for complete search history.

(56) References Cited

U.S. PATENT DOCUMENTS

| | | |
|---|---|---|
| 2010/0070492 A1 | 3/2010 | Dattatri et al. |
| 2011/0106550 A1 | 5/2011 | Skelton |
| 2012/0246168 A1 | 9/2012 | Srivastava et al. |
| 2013/0086078 A1* | 4/2013 | Malleshaiah .......... G06Q 30/02 707/748 |
| 2013/0166465 A1 | 6/2013 | Barros et al. |
| 2013/0187926 A1* | 7/2013 | Silverstein .......... G06Q 10/105 345/440 |
| 2013/0325860 A1 | 12/2013 | Howard |
| 2014/0129573 A1 | 5/2014 | Dewaal |
| 2014/0149302 A1 | 5/2014 | Zuccolillo et al. |
| 2014/0214710 A1 | 7/2014 | Dubner et al. |
| 2015/0127340 A1 | 5/2015 | Epshteyn et al. |
| 2015/0317602 A1* | 11/2015 | Rao .................... G06Q 10/1053 705/321 |

OTHER PUBLICATIONS

'SkillGigs', http://web.archive.org/web/20141018215852/http://www.skillgigs.com/, Oct. 18, 2014, pp. 1 to 2.

'SkillGigs', http://web.archive.org/web/20150315031933/https://www.skillgigs.com/, Mar. 23, 2015, pp. 1 to 13.

* cited by examiner

SYSTEM AND METHOD FOR GENERATING A THREE-DIMENSIONAL RESUME

CROSS-REFERENCE TO RELATED APPLICATIONS

The present application claims the benefit of U.S. Provisional Patent Application 62/065,979, filed 20 Oct. 2014, titled SYSTEM AND METHOD FOR GENERATING A THREE-DIMENSIONAL RESUME, the entire contents of which are hereby incorporated by reference for all purposes.

BACKGROUND

1. Field

The present invention relates generally to matching job candidates with recruiters and, more particularly, to systems and methods for improving the hiring process with three-dimensional and higher-dimensional resumes.

2. Description of the Related Art

Generally, conventional resumes are static documents. Such resumes do not show the true strengths and weaknesses of a person at one glance. Using a plain resume, employers are often not able to ascertain the true skill experience of a candidate, let alone do so by applying a scientific statistical method. People are not able to statistically evaluate a resume and tell if the resume properly represents them and their skill experience. Further, the majority of resumes submitted by job applicants cannot be parsed through thousands of applicant-tracking system ("ATS") requirements because resumes are not formatted correctly.

Many websites exist that allow job seekers and employers to find each other. However, these conventional websites do not address the problems set forth above, among other problems.

SUMMARY

The following is a non-exhaustive listing of some aspects of the present techniques. These and other aspects are described in the following disclosure.

According to certain aspects, a system and method of the invention interacts with job applicants to create a profile corresponding to them. The profile can be used to develop three-dimensional resume outputs including a skills density heat map, an industry density heat map and/or a (fully or partially) parseable resume that can be accessed by an employer to greatly assist in evaluating the applicant.

Some aspects include a process, including: receiving resume data from a computing device of a job candidate, the resume data including: a plurality of roles the job candidate has occupied, for each of the roles, a plurality of skills used by the job candidate in the respective roles, for each of the skills, a measure of usage of the respective skill in the respective role; combining the measures of usage of the each skill across the plurality of roles to form a skill density score for each of the skills; receiving a request for information about job candidates from a computing device of a recruiter; and sending data indicative of the skill density scores for at least some of the skills to the computing device of the recruiter.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
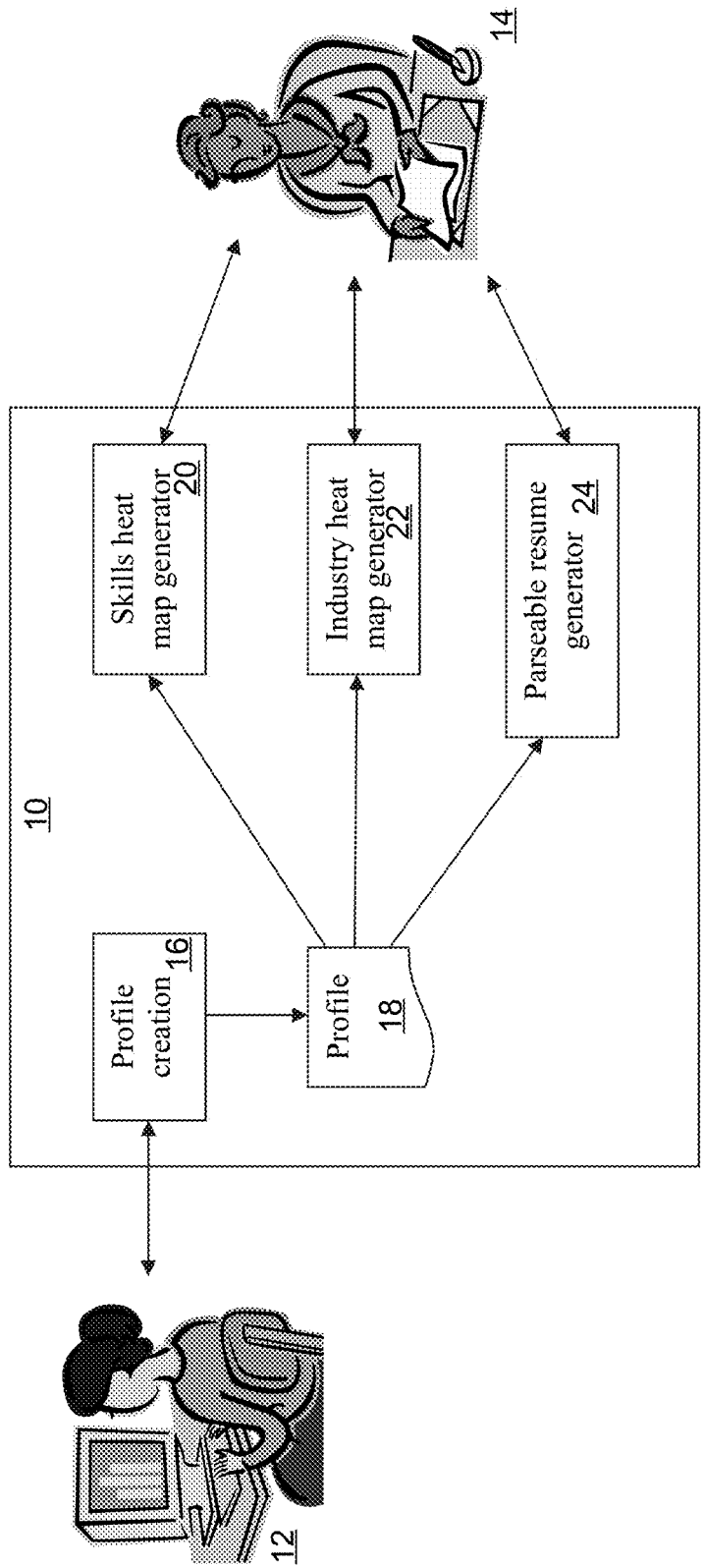
FIG. 1 is a block diagram illustrating an example system according to embodiments of the invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of human resources technologies. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

A block diagram illustrating an example system 10 implementing aspects of the inventions is shown in FIG. 1. In example embodiments, the system 10 is implemented by one or more server computers including one or more web servers that are publicly accessible on the Internet. In some embodiments, a computing device 12 of a job candidate provides data to the system 10, and a computing device 14 of a recruiter displays analyses of that data, both via the Internet, by interacting with system 10.

The terms "job candidate" and "job seeker" are used broadly to refer to those seeking work from others. The terms are not limited to those who would qualify as "employees" under employment law and includes consultants and independent contractors. The terms do not require that the "job candidate" have any particular mental state, e.g., intending to seek work, rather than merely submitting a resume out of curiosity as to how the market will respond.

Similarly, the terms "employer" and "recruiter" are not limited to those who will be contracting with the job candidate. These terms include those seeking job candidates on behalf of another and those analyzing a pool of candidates, regardless of their intent to hire.

As shown in FIG. 1, according to certain aspects of the inventions, the system 10 may include a profile creation module 16 that interacts with users to create a profile 18 corresponding to the user. The profile can be used by a skills heat map generator 20, an industry heat map generator 22 and/or a parseable resume generator 24 to produce three-dimensional resume outputs that can be accessed by an employer (or other recruiter), as will be described in more detail below. The term "heat map" is used to refer to higher dimensional graphical characterizations of resume attributes, e.g., where three or more of shape, color, transparency, size, horizontal position, vertical position, layer, and the like are varied according to dimensions of a resume. In some case, the term "heat map" is used to refer to an area chart in which an amount of area of a shape reflects the magnitude of a score. Alternatively, or additionally, other types of graphical representations may be produced, e.g., heat maps in which color varies over a 2D or higher dimensional field according to a score, bubble charts, bar charts, pie charts, Cartesian plots, tables, Voroni diagrams, treemaps, and the like.

According to some aspects of the inventions, the profile creation module 16 gathers types of information that are not typically available on a resume in the form of structured data. This information may be provided by a job seeker entering this information in a web form in the job candidate's web browser, and the web browser may send the information over the Internet to the profile creation module 16, which may construct and send the web forms. In some cases, the forms accept relatively granular information, which is then used to derive the different three-dimensional resume outputs. Other embodiments may have higher or lower dimensional resumes, for instance, some embodiments may represent four dimensions of some aspect of a job candidate's resume, or more.

In some embodiments, the profile creation methodology includes six different areas. The areas may correspond to fields in web forms constructed by the profile creation module, sent to the job candidate's computer, and populated by the job candidate, causing the corresponding information to be sent back to the profile creation module. Examples of these web forms and related resume data sent to the profile creation module are described below.

Figure 2:
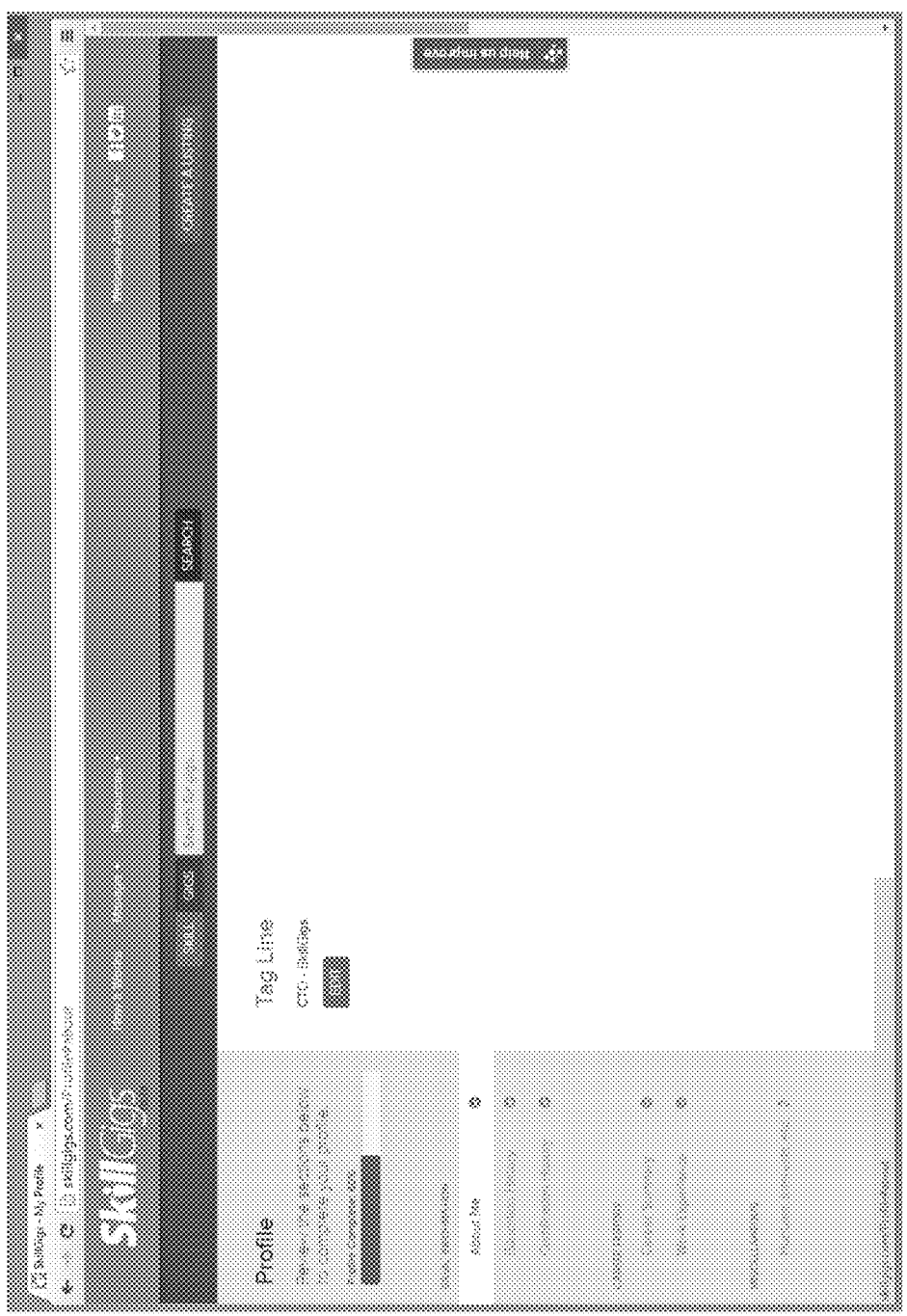
FIGS. 2-9 are screenshots illustrating aspects of an example profile creation methodology according to embodiments of the invention.

As shown in FIG. 2, one section is referred to as "About Me." This section is used to describe the job candidate's career summary and personality. The illustrated web form may be sent to the computing device 12 of the job candidate by the system 10, and the information entered in the illustrated fields may be sent to the system 10 upon entry by the job candidate as a portion of resume data gathered by the system 10.

Figure 3:
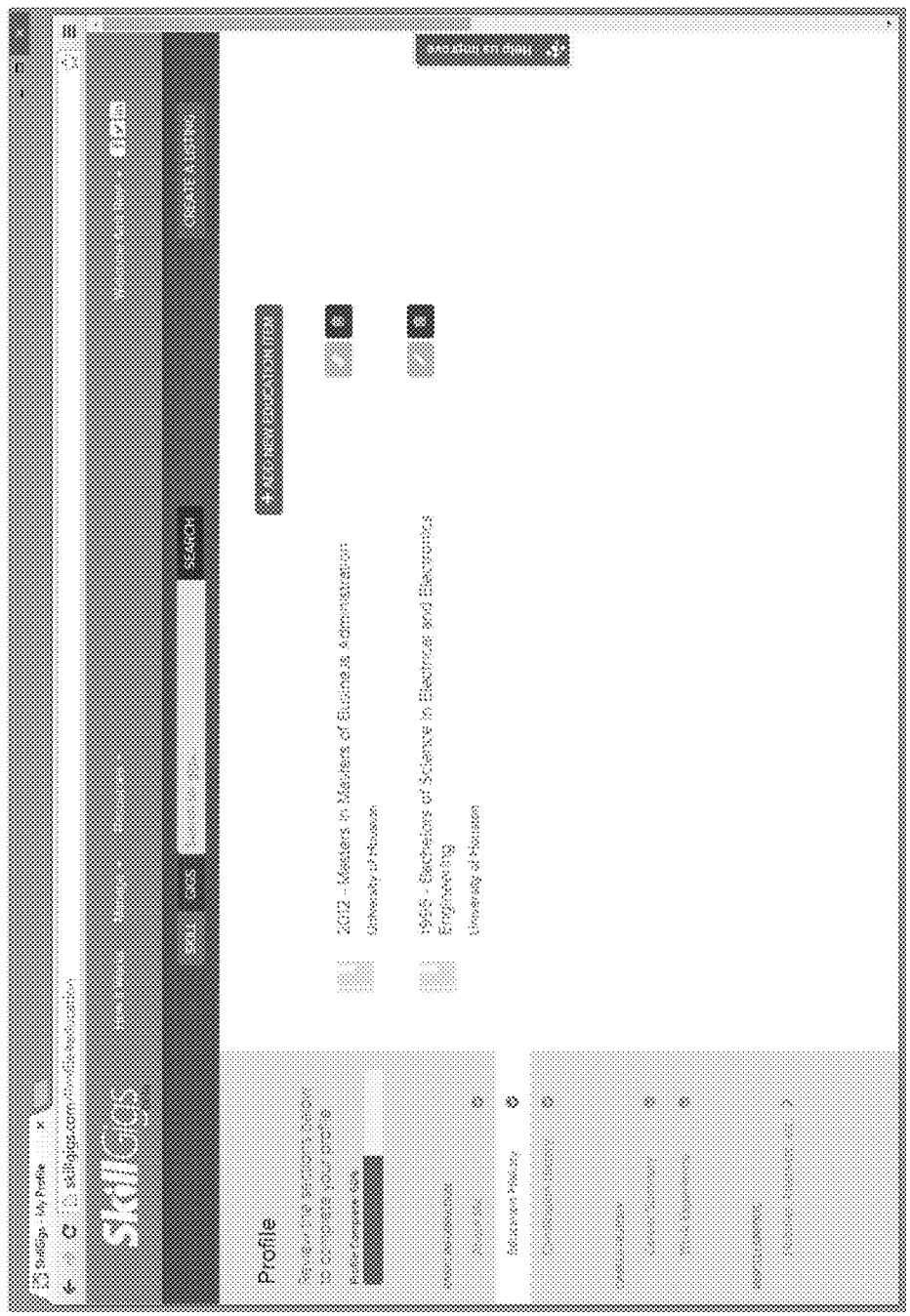

As shown in FIG. 3, a second section is referred to as "Education History." This section lists out the academic achievements of the consultant. The illustrated web form may be sent to the computing device 12 of the job candidate by the system 10, and the information entered in the illustrated fields may be sent to the system 10 upon entry by the job candidate as a portion of resume data gathered by the system 10.

Figure 4:
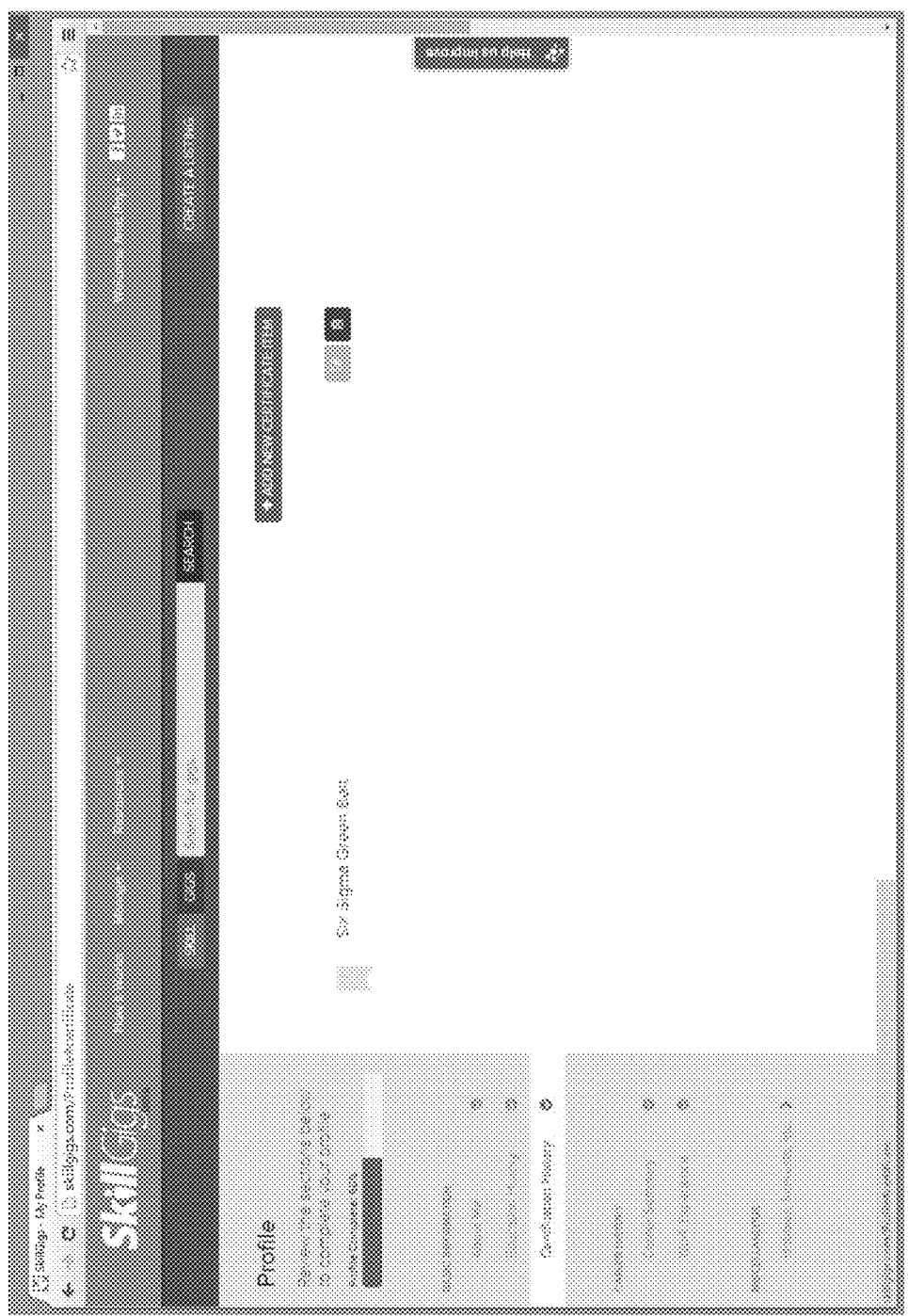

As shown in FIG. 4, a third section is referred to as "Certification History." This section lists out any certification received by the consultant. The illustrated web form may be sent to the computing device 12 of the job candidate by the system 10, and the information entered in the illustrated fields may be sent to the system 10 upon entry by the job candidate as a portion of resume data gathered by the system 10.

Figure 5:
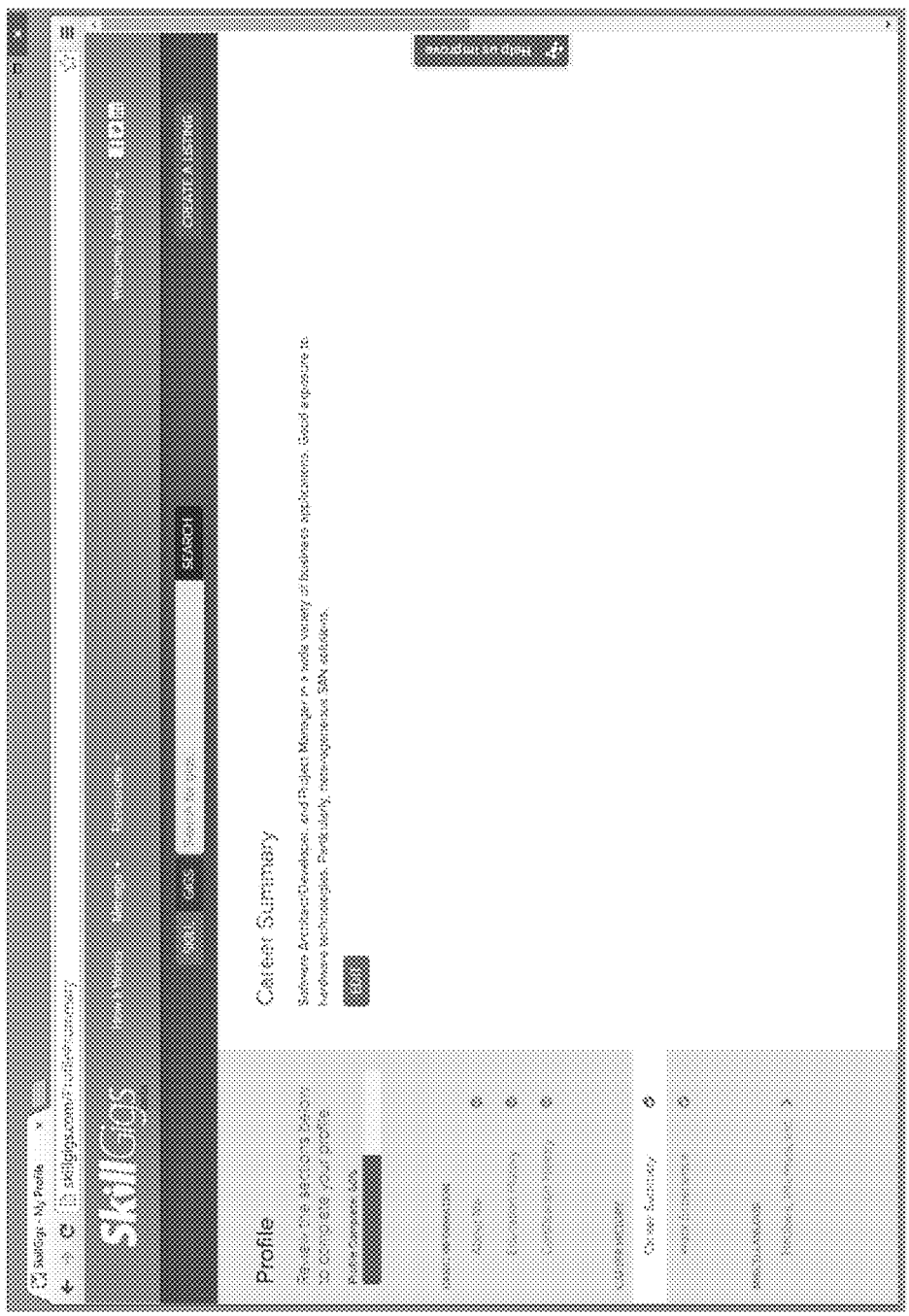

As shown in FIG. 5, a fourth section is referred to as "Career Summary." This obtains a more detailed career summary of the candidate. The illustrated web form may be sent to the computing device 12 of the job candidate by the system 10, and the information entered in the illustrated fields may be sent to the system 10 upon entry by the job candidate as a portion of resume data gathered by the system 10.

Figure 6:
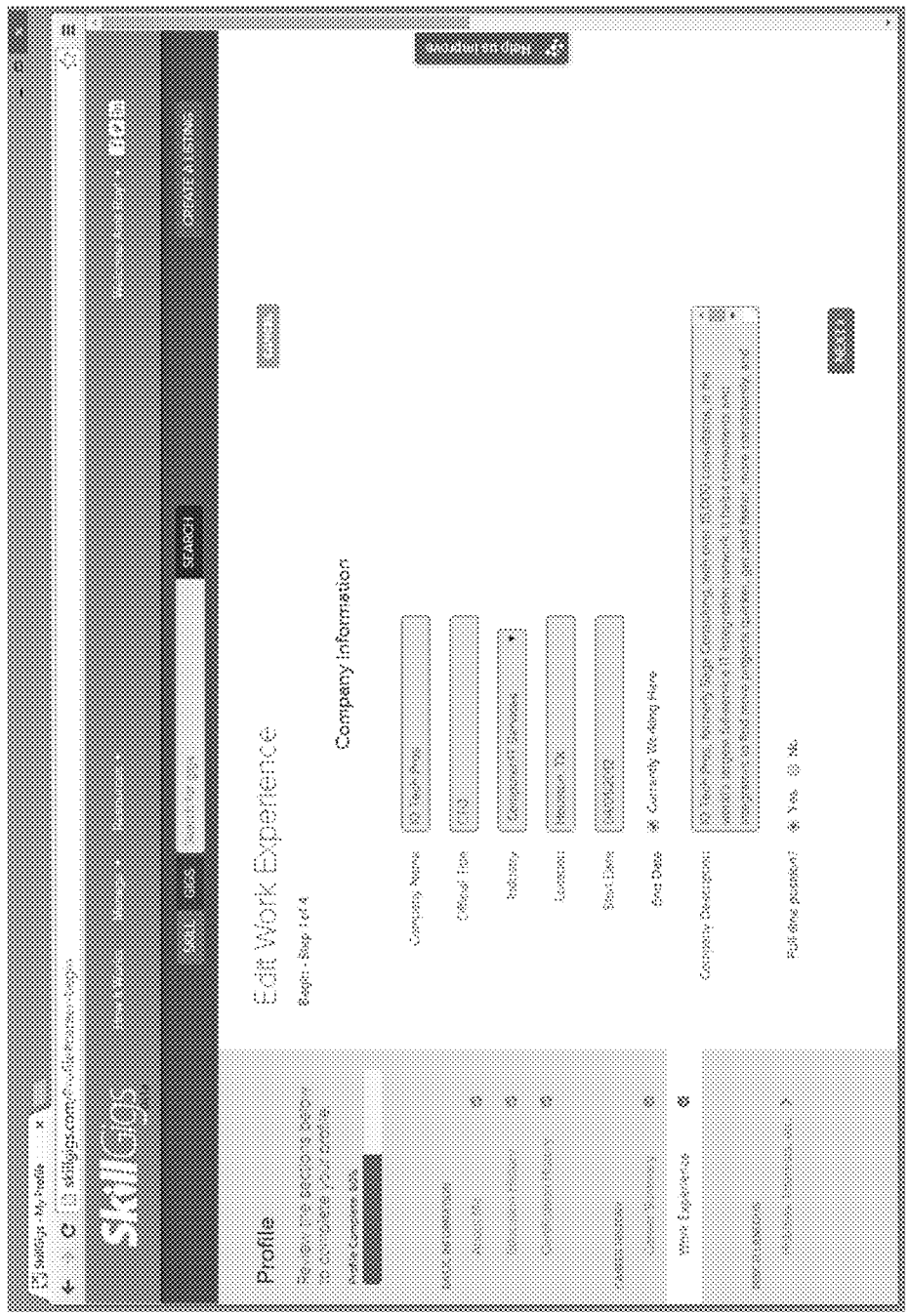

As shown in FIG. 6, a fifth section is referred to as "Work Experience." This is the most unique section of all, which is not to suggest that every embodiment must include this form or any of the fields therein, as other aspects of the present techniques are independently useful and multiple inventions are described. In this section the profile creation module asks the candidate to provide information including the industry (which may be used to calculate industry density) fields in the example screenshot of FIG. 6. The illustrated web form may be sent to the computing device 12 of the job candidate by the system 10, and the information entered in the illustrated fields may be sent to the system 10 upon entry by the job candidate as a portion of resume data gathered by the system 10.

Figure 7:

As shown in FIG. 7, the profile creation module also asks the candidate to specify the skills they used on the job on a percentage basis of the time spent on each skill at the job. This skill information is then distilled by a skills heat map generator 20 to determine a skill density. This score reflects, in some embodiments, the amount of time spent on a particular skill over the whole career lifespan of the candidate. The illustrated web form may be sent to the computing device 12 of the job candidate by the system 10, and the information entered in the illustrated fields may be sent to the system 10 upon entry by the job candidate as a portion of resume data gathered by the system 10.

Figure 8:
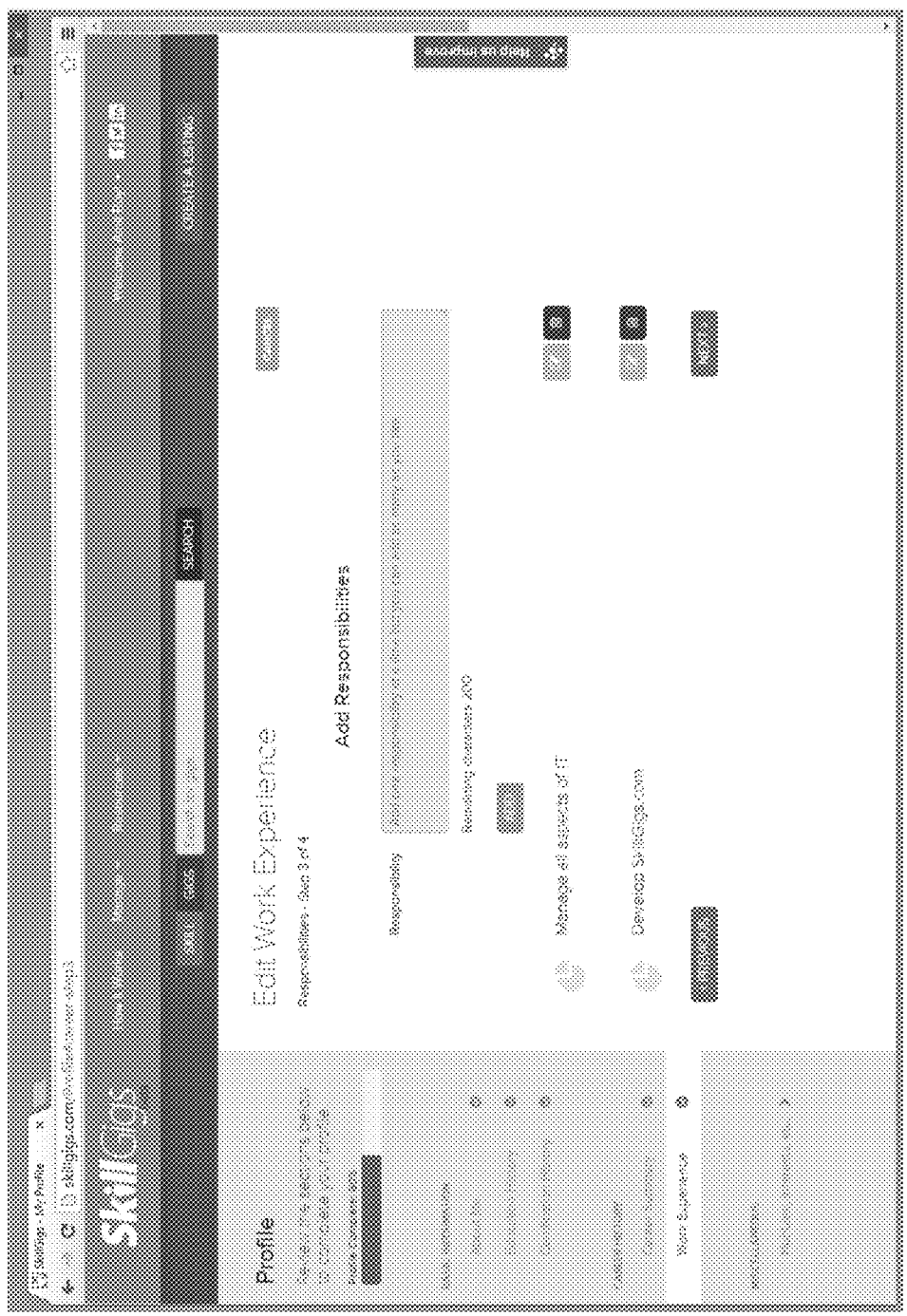

As shown in FIG. 8, the profile creation module further asks for a description of responsibilities at the current job. The illustrated web form may be sent to the computing device 12 of the job candidate by the system 10, and the information entered in the illustrated fields may be sent to the system 10 upon entry by the job candidate as a portion of resume data gathered by the system 10.

Figure 9:
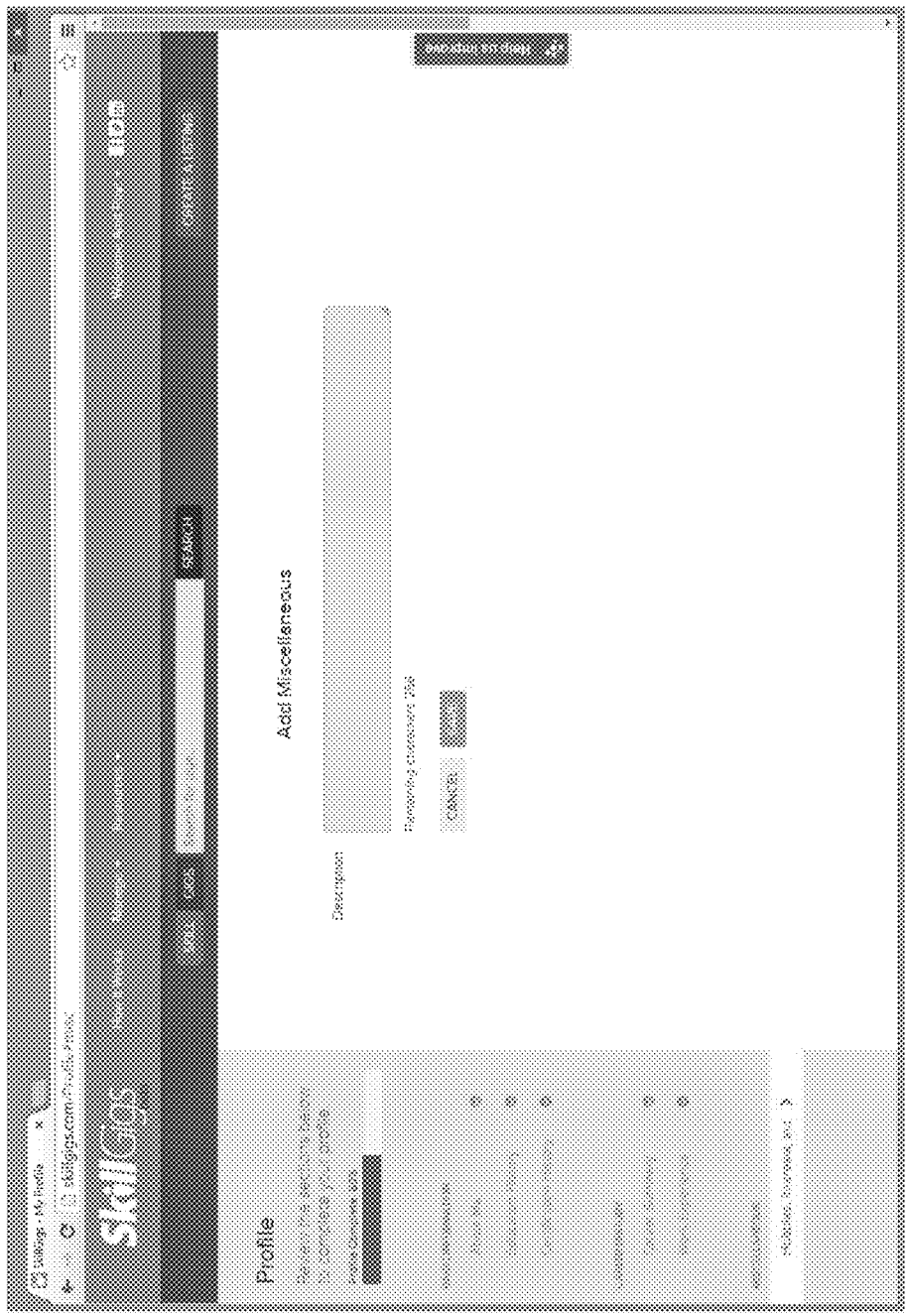

As shown in FIG. 9, a sixth section is referred to as "Miscellaneous." Here, a candidate can list out hobbies and interests in this section. This helps in overall personality and character recognition. The illustrated web form may be sent to the computing device 12 of the job candidate by the system 10, and the information entered in the illustrated fields may be sent to the system 10 upon entry by the job candidate as a portion of resume data gathered by the system 10.

All the resume data gathered above is then used by the profile creation module 12 to create a profile 18 (e.g., a record in a repository storing thousands or tens of thousands or more instances of resume data for different users) for the user that is in the form of a parsable resume (e.g., a perfectly parsable resume or a partially parsable resume). In some embodiments, the parsable record (e.g., structured data) is stored or distributed in a hierarchical data serialization format, such as a JavaScript object notation (JSON) file or an extensible markup language (XML) file, but can also be provided as a Word document or a PDF document. This resulting machine or human readable information may be sent to the computing device of the recruiter 14 upon request for such data via the Internet. Examples of data sent to the recruiter's computer are described below. In some cases, the information may be sent to a web browser of the computer 14 for display. In some cases, access to this data may be gated and provided upon determining that the user of computer 14 has an active subscription or has otherwise paid for access. Some embodiments may track whether a candidate is placed and bill according to a commission schedule.

Figure 10:
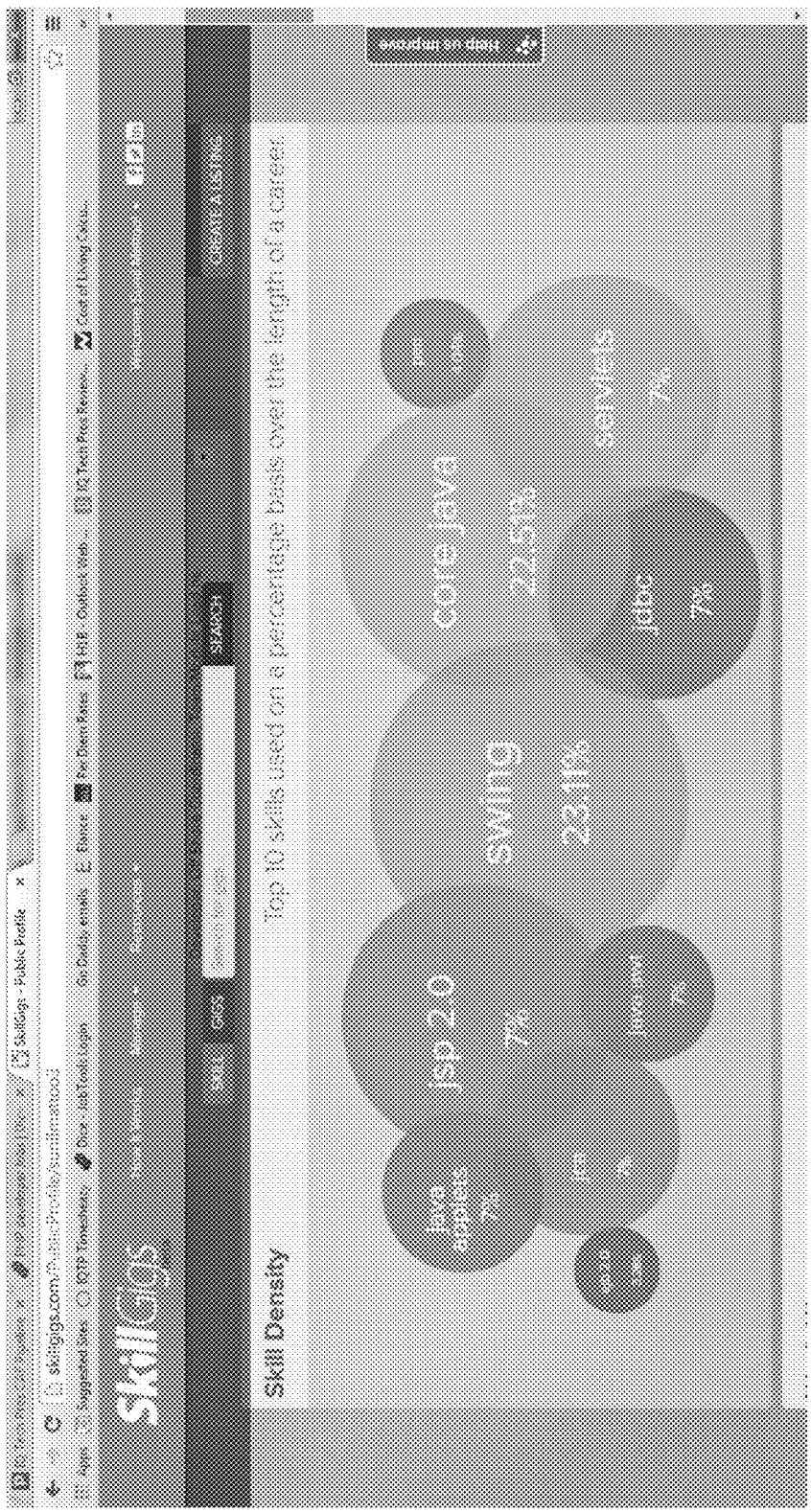
FIG. 10 is a screenshot illustrating aspects of an example skills heat map according to embodiments of the invention.

FIG. 10 is a screenshot illustrating aspects of a Skill Density Analysis, or Skill HeatMap, that can be generated by the skills heat map generator 20 of the system 10.

As mentioned above, using a traditional resume, it is generally impossible to ascertain the density level of a person's skills over the length of their career, or the real skills actually used by a person in their career. Often candidates provide a list of skills used in given role, without indicating whether each skill was used very rarely, or was used extensively. This information is generally of great interest to those hiring on the basis of a person having a particular skill.

According to the three-dimensional resume aspects of the invention, in some embodiments, the skills heat map generator 20 implements a method in which it 20 quantifies the skills a person has used in their various jobs over the length of their career, on a weighted percentage basis, adding factors of relevancy and importance of skill for a skill density score to come up with a relatively accurate representation of the person work experience. The generator 20 then takes this data and uses a state of the art algorithm to look for similar skill trends over a person's career and display this info as a Skill Density Heat Map, such as that shown in FIG. 10.

According to certain aspects that should be apparent from FIG. 10, the heat map includes skill "bubbles" that increase or decrease in size as the percentages within change. As such, it provides a 3D visualization of a person's skill density. Plus, the heat map changes in real time as the experience level of the individual changes.

FIG. 10, thus, shows an example of an area chart in which the area of a plurality of shapes indicates a skill density score for an indicated skill. In some embodiments, various shapes may be used, for example circles, squares, rectangles, octagons, or irregular shapes. In some cases, the areas consumed by each shape may be calculated relative to other skill density scores, for example some embodiments may map a hierarchical arrangement of skill density scores for a hierarchical ontology of skills in a tree map, or some embodiments may represent relative skill density scores in a Voroni diagram. In some cases, the color, translucency, drop shadows, or animated movements of the shapes may indicate additional values, such as the magnitude of the effect of skill age, skill duration, skill percentage or the like on the respective skills' density scores.

Figure 11:
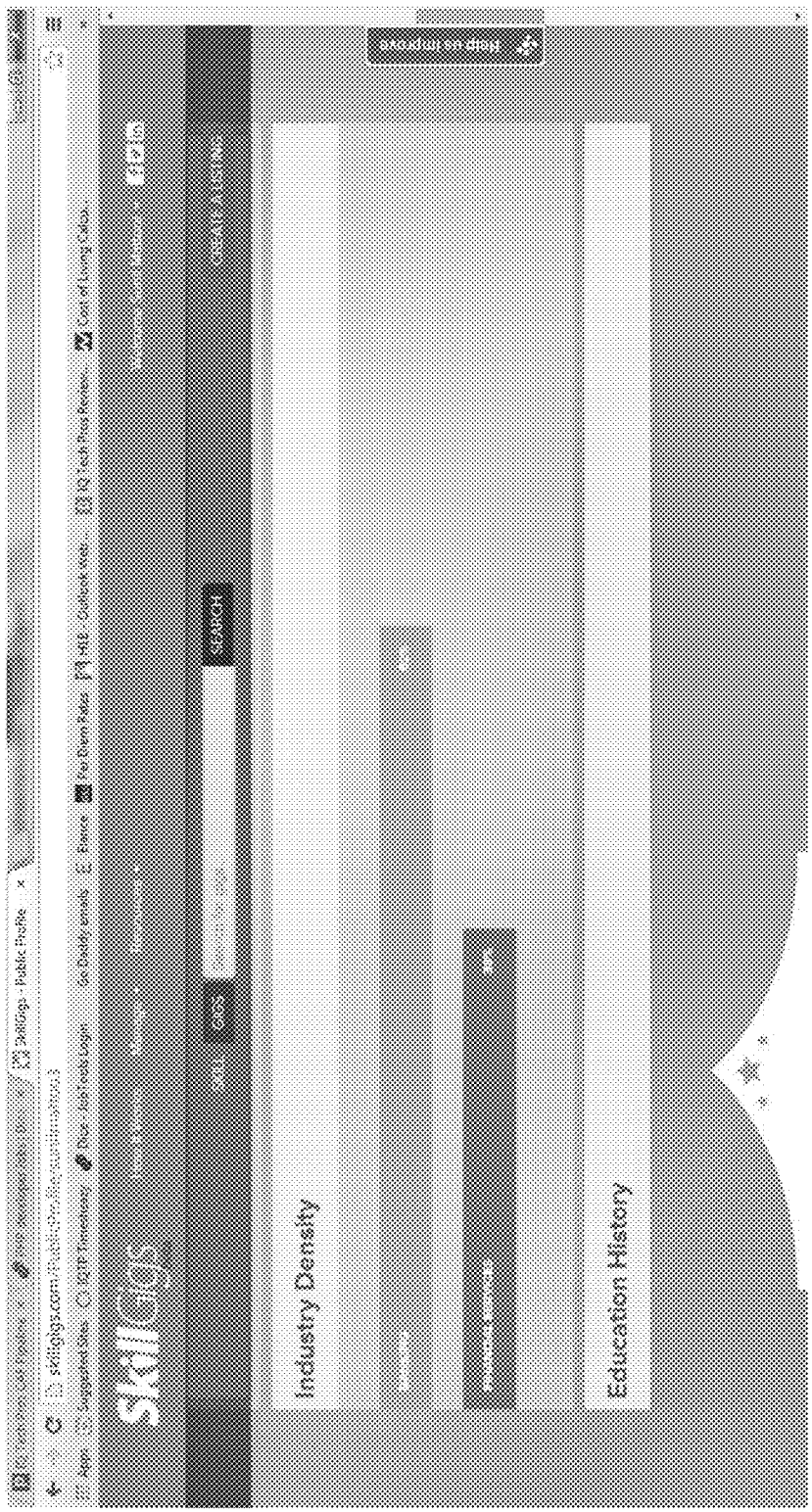
FIG. 11 is a screenshot illustrating aspects of an example industry heat map according to embodiments of the invention.

Often those reviewing resumes scan a relatively large number of candidates visually relatively quickly, so recruiters are expected to find graphical representations that are quickly visually parsed with a low cognitive load, like those of FIGS. 10 and 11, especially helpful. That said, embodiments are not limited to systems providing the illustrated types of graphical representations. Other graphical representations may be used, including tables including the scores and values by which the scores are calculated.

In some embodiments, circles may be sized or positioned according to a template. For instance, some embodiments may rank skills according to density, and then map the highest ranking skill to a circle with the largest size. The next skill down in the ranking may be mapped to a circle with a size 10% smaller (e.g., by radius or area), and so on. This technique is expected to provide a relative sense of skill densities, while avoiding making it difficult to read the skills across disparate scores, e.g., one skill at 99% and another at 1%. Some embodiments may omit skills from the graphical representation that do not exceed a threshold score to make the graphic more readily visually parsable.

A variety of techniques may be used to increase the speed with which recruiters can visually interpret the skill density scores and industry density scores. In some cases, the shapes may be positioned partially overlaying one another while still revealing enough of the shapes to convey the shape's area, thereby providing more information in a smaller area of a display screen. In some cases, the amount of overlay may be selected such that an overlaying shape at its boundary does not penetrate an inner protected boundary, such as a radius within the outer boundary of the shape to prevent text of the shapes from being overwritten, e.g., no more than 80% of the outer radius. In some cases, a layer or the color for each shape may be determined, for instance, based on an age, duration, or other value of the skill. Shapes may be positioned in X and Y coordinates (horizontally and vertically) according to a variety of techniques. In some cases, shapes may be modeled as physical objects resiliently attracted to one another, for instance, with damped linear springs connecting each shape in a graph of shapes. In some embodiments, the attraction may be subject to a damping factor that causes the shapes to settle into a final position rather than oscillate in a way that makes the shapes difficult to visually parse. In some cases, the shapes may be sorted according to area, with the largest shapes being positioned in the center and other shapes positioned to the left and right according to size. In some cases, the shapes may be positioned according to a circle packing algorithm operative to pack unequal circles, for instance. In some cases, the number of circles or other shapes may be thresholded to avoid overburdening the reviewer and highlight the most important skills. For instance some embodiments may retrieve and display only the top 10 skills according to skill density.

FIG. 11 is a screenshot illustrating aspects of an Industry Density Heat Map that can be generated by the industry heat map generator 22 of the system 10. In the illustrated example, density is represented in a bar chart, with an industry density score, examples of which are described below with reference to FIG. 13. In some embodiments, this generator 22 implements an algorithm that tracks the industries an individual has worked in and then based on a relevancy formula displays the data as an industry heat map such as that shown in FIG. 11.

Figure 12:
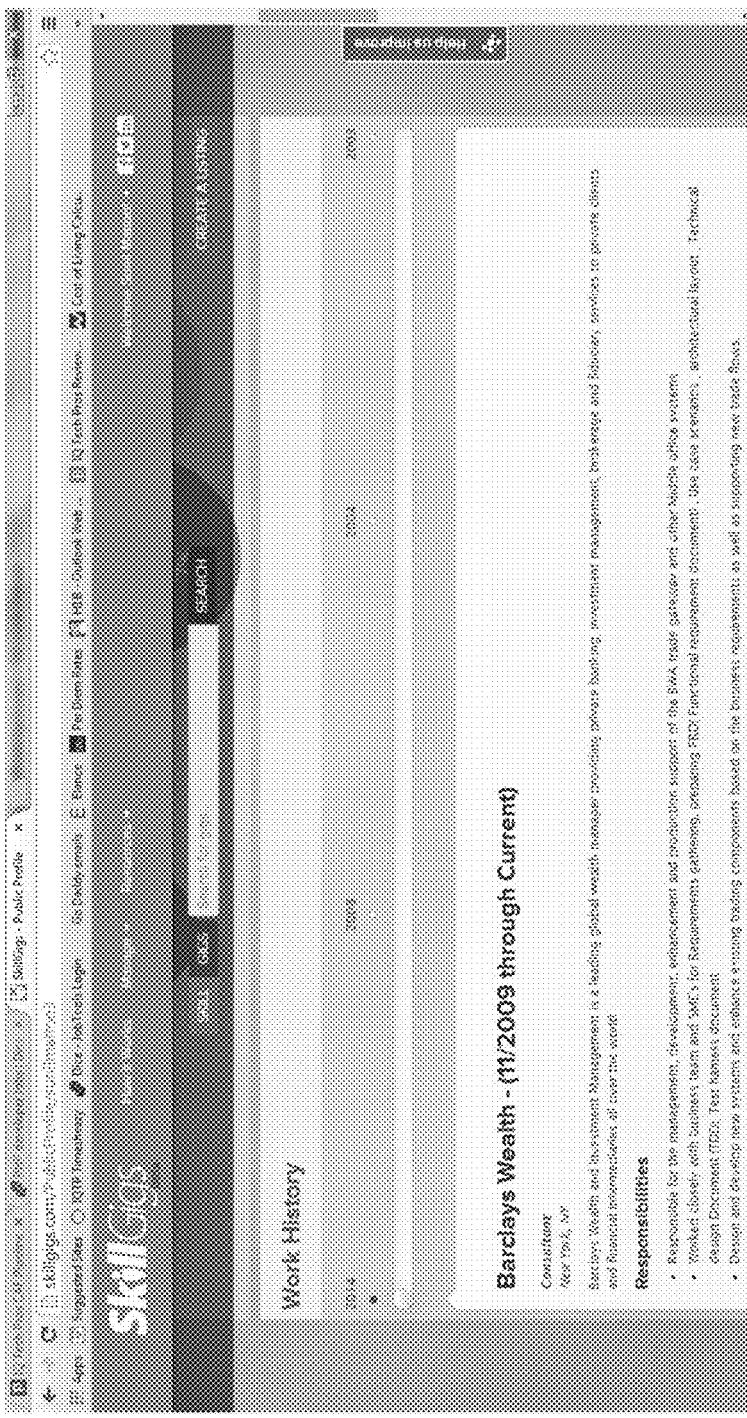
FIG. 12 is screenshot illustrating aspects of an example fully parseable resume according to embodiments of the invention.

FIG. 12 is a screenshot illustrating aspects of an Automatically Created Parsable Resume that can be generated by the parseable resume generator 24 of the system. In some cases, some or all of the information may be sent in the form of a serialized, parseable data file as structured resume data, e.g., JSON or XML, to the computer 14, for instance, complying with requirements of an applicant tracking system implemented with the computer 14. In some cases, the computer 14 may ingest this data and add the data to a data repository, such as a relational database or programmatically analyze the data, or in some cases, the data may be immediately displayed to the user, e.g., in a web browser.

Using the unique (which is not to suggest that all embodiments have this feature, as there are other unique and independently useful aspects) profile creation method described above, the generators 20, 22, and 24 are able to create a machine-readable, structured-data resume (e.g., a perfectly formatted resume), which in some cases complies with resume guidelines of ATSs supported by some embodiments of the present invention.

Thus, some embodiments may provide a three-dimensional resume and automatically generate a machine-readable, structured-data resume, which in some cases, can be parsed by over 90% of the parsing engines available, such as those in ATSs. In some cases, the structured data may comply with over 1300 resume parsing requirements implemented by various ones of a plurality of parsing engines.

As shown in FIG. 12, embodiments of this generator 24 also provide a historical resume timeline. In some cases, the illustrated slider may cause the illustrated text to change to depict the corresponding portion of job candidate's work history.

Figure 13:
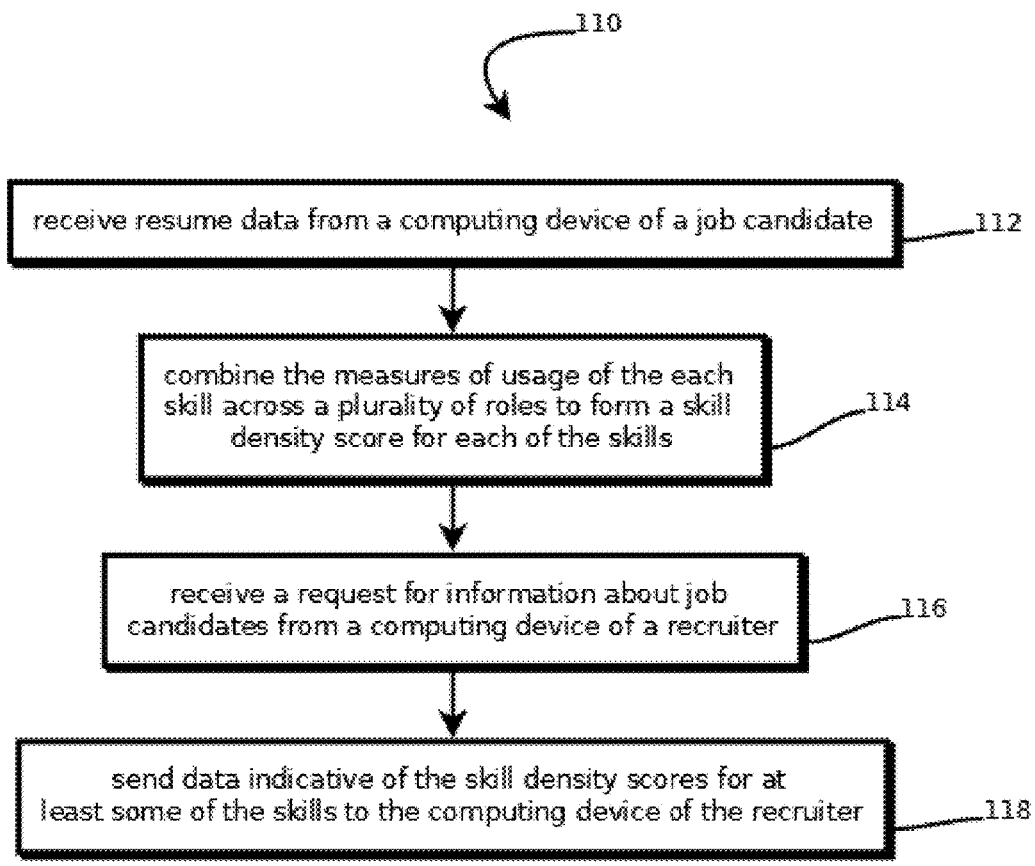
FIG. 13 is a flow chart illustrating a process for generating a 3D resume in accordance with some embodiments.

FIG. 13 is a flowchart showing an example of a process 110 for generating a higher-dimensional resume, such as a three-dimensional resume. In some embodiments, the process 110 may be performed by the system 10 described above. But embodiments are not limited to that implementation. In some embodiments, the process 110 may be embodied by computer program code stored on a tangible, non-transitory, machine-readable medium, for instance, in the form of instructions that when executed by one or more processors effectuate the operations of process 110.

In some embodiments, the process 110 includes receiving resume data from a computing device of a job candidate, as indicated by block 112. In some embodiments this step may be performed by the above-described profile creation module 16. In some embodiments the received resume data may be the data input into the above-described web forms by a job candidate. In some embodiments, the browser rendering the web forms may cause the entered data to be transmitted to the system 10. In some embodiments the data may be sent in the form of a hypertext transport protocol POST request. In some cases, the received resume data may be received in a single session or across multiple sessions with the job candidate. In some embodiments, the received resume data may be received in multiple portions, each portion solicited by a different web form.

A variety of types of information may be included in the resume data. Examples of the received resume data include a tagline for the resume, an educational history (including dates of attendance, degrees completed, grades, and names of educational institutions), a listing of professional certificates, and a prose career summary. Embodiments of resume data may include a plurality of roles, such as jobs or positions, held by the job candidate. In some cases, each of the roles may include a company name, a title, an industry, a location, a start date, an end date or indication of whether the person is currently employed in the role, a description of the company, an indication of whether the position was full-time, and skills used when occupying the role. In some cases, the skills may be things like proficiency in various programming languages, proficiency with various tools (e.g., word processing tools, video editing tools, computer-aided design tools, and the like), and experience with various job functions (like project management, sales, negotiating vendor agreements, and the like).

In some embodiments, each skill may be associated with a measure of usage of the skill while in the role. For instance, the measure of usage may be a percentage indicating how much that skill was used, e.g., by time, significance, unit of work product, or a combination. In some embodiments, the system 10 may validate received data to ensure that percentages for any given role do not exceed 100%. In some embodiments, the percentages may reflect the percentage of the job candidate's time while in the role spent using the skill, or the percentage use may reflect a relative importance of that skill compared to other skills brought to bear while in the role.

Some embodiments may further include a prose description of the job candidates responsibilities while in the respective role and other information. In some cases, the job candidate may have multiple roles while employed by a single employer, for instance as a result of promotions or transfers within a company.

In some cases, a job candidate may have multiple employers during a given duration of time, for instance while moonlighting or working part time at multiple employers. In some cases, the resume data may include a percent employed for each role, indicating the portion of the user's workweek allocated to each role. In some cases, self-reported skills may be quantified according to both this percentage as well as the measure of usage of the skill while in the role. Further, as explained below some embodiments may quantify skill usage according to the duration of time over which the skill was used and the age of the skill usage, diminishing the measure when skills were not use relatively recently, and increasing the measure in response to relatively long durations of usage of the skill.

In some embodiments, the received resume data may be stored in resume records, each resume record being associated with a unique user identifier, login credentials, and various preferences of a given job candidate. In some embodiments, the system 10 may include a data repository storing a relatively large number of such records, for example, numbering in the thousands, tens of thousands, hundreds of thousands, or more. In some cases, these records may be augmented with processing performed in various subsequently describe steps.

Some embodiments may validate and normalize received resume data. For instance, some embodiments may sum percentages to confirm that percentages do not exceed 100%. Some embodiments may further validate place names against a listing of place names. Some embodiments may search received resume data to remove executable code, for instance, to prevent SQL injection attacks and the like. Some embodiments may validate date ranges in the resume data against plausible date ranges, for instance, rejecting dates more than the expected lifespan of a human being, like older than 120 years from the present date. Some embodiments may normalize data, for instance, converting place names to a standardized format and dates to a standardized format.

The usefulness of a repository of resumes increases as more resumes are obtained. Some embodiments are expected to operate with relatively large scales of data. In some cases, a relatively large number of job candidates may submit resume data concurrently through separate sessions. For instance, some embodiments may support several hundred or several thousand concurrent sessions. Similar numbers of recruiters may engage in concurrent sessions to review those resumes. In some cases, non-blocking web servers service the corresponding requests, and some embodiments may include load balancing servers and replicate the various modules described above to operate at such scales while meeting user's expectations for relatively low latency responses.

In some cases, a single job candidate may occupy a plurality of different roles over a duration of time, in some cases, occupying multiple roles at the same time. Further, each role may be associated with the plurality of skills used by the job candidate in the respective role, and each of the skills may be associated with a measure of usage of the respective skill in the respective role. For instance, a job candidate may indicate that they worked for a given employer for three years ending two years ago and that while at that employer they had the job title of developer and used the skill of Java programming 70% of the time and the skill of project management 30% of the time. In some cases, the listing of skills may be relatively expansive, for instance including 10 or more skills while in a given role, and in some cases, the same skill may be present while the job candidate filled different, non-concurrent roles, for instance, as a person transitions to a different job and continues to work as a Java developer, for instance, 20% of the time while taking on more project management tasks accounting for 70% of their time. Accounting for these differences in skill usage, including the relative importance of the skill, the duration over which the skill was applied, and the age of the use of the skill, can be relatively complicated, particularly as job candidates transition more frequently between different jobs. Traditionally, this task would be magnified in complexity for recruiters seeking to evaluate hundreds or thousands of potential candidates, each of whom may present a relatively burdensome problem of synthesizing this information.

To mitigate this burden, some embodiments may combine the measures of usage of the same skill across the plurality of roles to form a skilled density score for each of the skills for the given job candidate, as indicated by block 114. In some cases, this step may be performed by the above-describe profile creation module 16. In some cases, the skill density scores may be precalculated and stored before queries are received for resumes to facilitate relatively fast responses to such queries and indexing according to skills. For instance, some embodiments may index resumes according to the highest scoring skills, skills scoring over a threshold, or according to the top three skills density scores. This is expected to facilitate relatively fast responses to recruiter queries for, for instance, Python developers having greater than a threshold skill density score, willing to live in a given area, and having between 3 and 5 years experience. In other embodiments, skill densities may be calculated at query time.

The measures of usage (which may be characterized as a quantification of expected proficiency, or as a skill density) of each skill may be combined in a variety of different ways. Some embodiments may include weighting the reported usage amount of the skill, such as a percentage, according to the duration over which the skill was applied in the respective role where used, the amount of time that has elapsed since the skill was applied in the respective role, and the percentage of the job candidate's time spent in a job in which the skill was applied, for instance, when a user indicates part-time positions. In some cases, longer durations of usage may correlate to higher skill density scores, older more atrophied usage may correlate with lower density scores, and division of time among multiple jobs may correlate with lower density scores. In some cases, the measure of usage for a first job may be weighted according to the amount of time the user was at the first job and the time since the user was at the first job, and this weighted value may be summed with a measure of usage at a next job that has similarly been weighted with the amount of time the user was at the next job and the time since the user was at the next job. In some cases, these two weighted values may be combined with a measure of central tendency, such as a mean, a median, or a mode. In one example, a person may have a first job as a software developer in which the person indicates a measure of usage of Python development of 30%, project management of 20%, and JavaScript development of 50% for a duration of five years ending one year ago. The same person may similarly have a second job beginning a year ago in which they are current employed, engaging in JavaScript development of 80% and relational database management of 20%. In some cases, the experience with JavaScript development between these two roles may be combined in an aggregate density score, for instance, as a single number that accounts for the measure of usage the duration of usage and the time since usage. Similar scores may by calculated for the other skills listed. In some cases, weighting based on time may be proportional to the amount of time, or non-linear weights may be calculate, e.g., a half-life may be calculated to account for diminishing returns of additional learning, or to account for diminishing amounts of skill to atrophy over time. In some cases, the weight may change proportional (e.g., inversely or directly) to the square root of the duration of time.

Skills may be organized and analyzed in a variety of fashions. For instance, skills may be organized in hierarchical ontology of skills, e.g., grouping skills by technical and non-technical skills at a top level, various technical domains (like software development mechanical engineering, circuit design, and the like) at a first lower level, and various subdomains that are relatively specific, for instance, specific programming languages, types of mechanical engineering, or analog versus digital circuit design at a second, even lower level. In some embodiments, skill density scores may be calculated at each level of the hierarchy of the ontology to group related but distinct skills under a reported number for a more general characterization. Similar ontologies and density scores may be calculated for industry participation or other aspects of a resume.

Some embodiments may further combine measures of industry participation associated with each of the roles to provide an aggregate score for each industry, such as an industry density score. For instance, a user may participate in the oil and gas industry for five years, the telecommunications industry for two, and then returned to the oil and gas industry for another three years. Some embodiments may group the time spent in the oil and gas industry together to calculate the value indicative of the relative amount of time spent in the oil and gas industry, such as the percentage of total worktime within the industry. Some embodiments may calculate a cross product score with the skill density score and the industry score to calculate an industry-specific skill density score, for instance, weighting the skill density score with the percentage of the user's time spent in each industry. In some cases, industry density scores may be calculated with any of the techniques described above for skill density scores, e.g., favoring more recent and long experience in a given industry.

Embodiments may calculate similar scores for a variety of other attributes appearing in a candidate's resume. Other aspects include, for example, aspects of cultural fit, personality type, and the like.

In some cases, the calculated scores may be stored in association with corresponding resume record, for example in the hierarchical serialized data formats described above.

Some embodiments may then receive a request for information about job candidates from a computing device of a recruiter, as indicated by block 116. Next, some embodiments may send data indicative of the skill density scores for at least some of the skills to the computing device of the recruiter, as indicated by block 118.

In some cases, these steps 116 and 118 may be performed via a web server of the system 10 described above. In some cases, the request may include criteria by which candidates are to be filtered. For instance, a request may be received for candidates with expertise in a particular programming language who are willing to live in a particular geographic region and have certain educational credentials. Some embodiments may search the stored resume records, identify responsive records, and send a listing of responsive job candidates to the computing device of the recruiter for display. Upon the recruiter selecting a given candidate, some embodiments may create a graphical representation of information about that candidate and send various types of information, for instance, in a standardized resume format, examples of which are described above with reference to FIGS. 10, 11, and 12.

Figure 14:
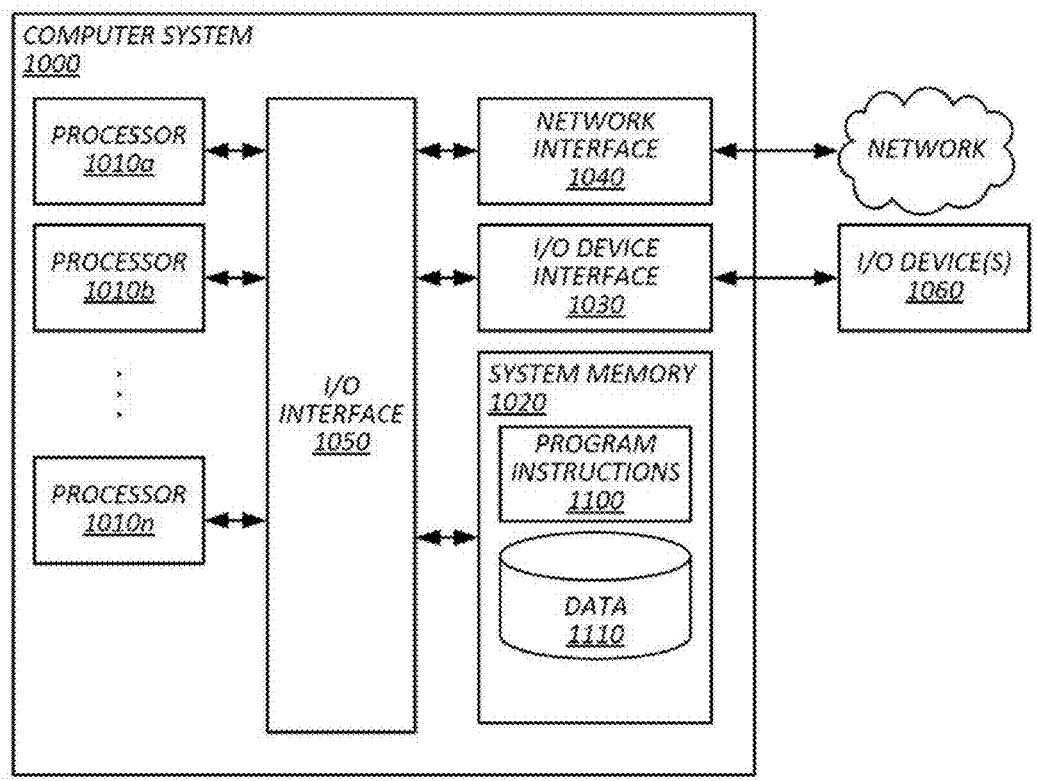
FIG. 14 is a block diagram of an example computer system by which some embodiments may be implemented.

FIG. 14 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times, e.g., a copy may be created by writing program code to a first-in-first-out buffer in a network interface, where some of the instructions are pushed out of the buffer before other portions of the instructions are written to the buffer, with all of the instructions residing in memory on the buffer, just not all at the same time.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, any such conflicting text in such incorporated by reference U.S. patents, U.S. patent applications, and other materials is specifically not incorporated by reference in this patent.

What is claimed is:

1. A method, comprising:
   receiving resume data from a computing device of a job candidate, the resume data including:
      a plurality of roles the job candidate has occupied,
      for each of the roles, a plurality of skills used by the job candidate in the respective roles, and
      for each of the skills, a measure of usage of the respective skill in the respective role;
   combining the measures of usage of the each skill across the plurality of roles to form a skill density score for each of the skills, wherein:
      at least some of the roles are associated in the received resume data with data indicative of a duration of time the job candidate occupied the respective role; and
      at least some of the roles are associated in the received resume data with data indicative of a duration of time that has elapsed since the job candidate occupied the respective role; and
   forming a skill density score for each of the skills comprises:
      for each of the roles, and for each of the measures of usage of the respective skills in the respective roles, adjusting the respective measures of usage based on both the duration of time the job candidate occupied the respective role and the duration of time that has elapsed since the job candidate occupied the respective role; and
      summing the adjusted measures of usage of the each skill across the plurality of roles to form a sum of usages for each skill;
   receiving a request for information about job candidates from a computing device of a recruiter; and
   sending data indicative of the skill density scores for at least some of the skills to the computing device of the recruiter, the sent data causing the computing device of the recruiter to present a user interface that graphically indicates skill strengths with values of visual attributes of shapes that span roles and account for elapsed time since roles were occupied, measures of usage of skills in roles, and durations of roles, wherein sending data indicative of the skill density scores for at least some of the skills to the computing device of the recruiter comprises specifying an area chart at least in part by:
      accessing a template that at least partially specifies sizes of a plurality of differently sized shapes;
      ranking each of the skills according to skill density score; and
      mapping the skills to the differently sized shapes of the template based on the ranking such that skills at one end of the ranking are mapped to larger shapes than skills at another end of the ranking, wherein:
         the skills are displayed in the area chart according to the mapping; and
         at least some sizes of shapes are not proportionate to corresponding skill density 7 scores of skills mapped to corresponding shapes.

2. The method of claim 1, wherein:
   at least some of the roles are associated in the received resume data with an industry in which the job candidate occupied the respective role, the method comprises:
calculating an aggregate industry experience score based on the received industry.

3. The method of claim 1, wherein the measure of usage of the respective skill in the respective role includes a percentage of the job candidate's time spent using the respective skill.

4. The method of claim 1, comprising:
for each of at least a plurality of the skills, determining a dimension of a graphical representation of the skill density score of the respective skill, wherein:
sending data indicative of the skill density scores comprises sending instructions to the computing device of the recruiter to display the graphical representations.

5. The method of claim 4, wherein:
the graphical representations comprise discrete shapes in an area chart, wherein each shape represents a respective one of the skills and an area of each shape corresponds to the skill density score of the respective skill.

6. The method of claim 5, wherein the shapes are circular and the area non-proportionally corresponds to the skill density score over at least part of a range of skill density scores.

7. The method of claim 1, comprising:
steps for validating and normalizing received resume data; and
steps for causing skill density scores to be presented in an area chart.

8. The method of claim 1, wherein the template specifies both sizes and positions of the shapes, and at least some of the shapes are circles.

9. The method of claim 1, wherein:
at least some of the shapes overlay other shapes in the area chart; and
an amount of overlay between shapes is selected by determining that an overlaying shape at its boundary does not penetrate an inner protected boundary of an overlaid shape.

10. The method of claim 9, wherein:
the shapes are circles; and
the inner protected boundary is specified by a threshold a radius of the overlaid shape.

11. The method of claim 9, wherein:
positions of the shapes in the area chart are specified, at least in part, by modeling the shapes as physical objects resiliently attracted to one another and subject to a damping factor that causes the shapes to settle into a final position rather than oscillate.

12. The method of claim 1, wherein sending data indicative of the skill density scores for at least some of the skills to the computing device of the recruiter comprises specifying an area chart in which skill density scores are indicated by dimensions of circles and circles are positioned according to a circle packing algorithm operative to pack unequal circles.

13. The method of claim 1, wherein:
the skills are organized in a hierarchical ontology of skills; and
at least some skill density scores are determined at each hierarchical level of the hierarchical ontology to group related but distinct skills under respective skill density scores affording a more general characterization of skills than skill density scores of skills in the respective group.

14. A system, comprising:
one or more processors; and
memory storing instructions that when executed by at least some of the one or more processors effectuate operations comprising:
receiving resume data from a computing device of a job candidate, the resume data including:
a plurality of roles the job candidate has occupied,
for each of the roles, a plurality of skills used by the job candidate in the respective roles, and
for each of the skills, a measure of usage of the respective skill in the respective role;
combining the measures of usage of the each skill across the plurality of roles to form a skill density score for each of the skills, wherein:
at least some of the roles are associated in the received resume data with data indicative of a duration of time the job candidate occupied the respective role; and
at least some of the roles are associated in the received resume data with data indicative of a duration of time that has elapsed since the job candidate occupied the respective role; and
forming a skill density score for each of the skills comprises:
for each of the roles, and for each of the measures of usage of the respective skills in the respective roles, adjusting the respective measures of usage based on both the duration of time the job candidate occupied the respective role and the duration of time that has elapsed since the job candidate occupied the respective role; and
summing the adjusted measures of usage of the each skill across the plurality of roles to form a sum of usages for each skill;
receiving a request for information about job candidates from a computing device of a recruiter; and
sending data indicative of the skill density scores for at least some of the skills to the computing device of the recruiter, the sent data causing the computing device of the recruiter to present a user interface that graphically indicates skill strengths with values of visual attributes of shapes that span roles and account for elapsed time since roles were occupied, measures of usage of skills in roles, and durations of roles, wherein sending data indicative of the skill density scores for at least some of the skills to the computing device of the recruiter comprises specifying an area chart at least in part by:
accessing a template that at least partially specifies sizes of a plurality of differently sized shapes;
ranking each of the skills according to skill density score; and
mapping the skills to the differently sized shapes of the template based on the ranking such that skills at one end of the ranking are mapped to larger shapes than skills at another end of the ranking, wherein:
the skills are displayed in the area chart according to the mapping; and
at least some sizes of shapes are not proportionate to corresponding skill density scores of skills mapped to corresponding shapes.

15. The system of claim 14, wherein:
at least some of the roles are associated in the received resume data with an industry in which the job candidate occupied the respective role, the operations comprise:
 calculating an aggregate industry experience score based on the received industry.

16. The system of claim 14, wherein the measure of usage of the respective skill in the respective role includes a percentage of the job candidate's time spent using the respective skill.

17. The system of claim 14, the operations comprising:
 for each of at least a plurality of the skills, determining a dimension of a graphical representation of the skill density score of the respective skill, wherein:
 sending data indicative of the skill density scores comprises sending instructions to the computing device of the recruiter to display the graphical representations.

18. The system of claim 17, wherein:
 the graphical representations comprise discrete shapes in an area chart, wherein each shape represents a respective one of the skills and an area of each shape corresponds to the skill density score of the respective skill.

19. The system of claim 18, wherein the shapes are circular and the area non-proportionally corresponds to the skill density score over at least part of a range of skill density scores.

* * * * *